United States Patent
Fujii

(10) Patent No.: US 8,677,164 B2
(45) Date of Patent: Mar. 18, 2014

(54) MICROCOMPUTER AND CONTROL METHOD THEREOF

(75) Inventor: Megumi Fujii, Kanagawa (JP)

(73) Assignee: Renesas Electronics Corporation, Kawasaki-shi, Kanagawa (JP)

(*) Notice: Subject to any disclaimer, the term of this patent is extended or adjusted under 35 U.S.C. 154(b) by 258 days.

(21) Appl. No.: 13/064,355

(22) Filed: Mar. 21, 2011

(65) Prior Publication Data

US 2011/0239018 A1 Sep. 29, 2011

(30) Foreign Application Priority Data

Mar. 24, 2010 (JP) .................................. 2010-68069

(51) Int. Cl.
*G06F 1/32* (2006.01)

(52) U.S. Cl.
USPC ............ 713/322; 713/300; 713/320; 713/324

(58) Field of Classification Search
None
See application file for complete search history.

(56) References Cited

U.S. PATENT DOCUMENTS

| 6,105,142 A * | 8/2000 | Goff et al. ..................... 713/324 |
| 2005/0262374 A1 | 11/2005 | Shinkawa |
| 2007/0288778 A1* | 12/2007 | Zhuang et al. ................ 713/320 |
| 2009/0259863 A1* | 10/2009 | Williams et al. .............. 713/323 |

FOREIGN PATENT DOCUMENTS

| JP | 1-260517 A | 10/1989 |
| JP | 05-313778 A | 11/1993 |
| JP | 2005-332245 A | 12/2005 |

OTHER PUBLICATIONS

Notification of Reasons for Refusal dated Nov. 12, 2013 with English translation.

* cited by examiner

*Primary Examiner* — Paul Yanchus, III
(74) *Attorney, Agent, or Firm* — McGinn IP Law Group, PLLC

(57) ABSTRACT

A microcomputer according to the present invention includes: a CPU (Central Processing Unit) that has a plurality of modes including a usual operational mode and a STANDBY mode, a clock supply being stopped in the STANDBY mode; a clock generation circuit that generates a clock supplied to the CPU; and a control circuit that monitors a mode of the CPU, determines a mode to which the CPU should transit according to the mode of the CPU and a type of an interruption request to the CPU, and controls the clock generation circuit according to the determined mode.

18 Claims, 10 Drawing Sheets

| CAUSE OF INTERRUPT | MAINRUN | MAINHALT | SUBRUN | SUBHALT | STOP |
|---|---|---|---|---|---|
| INT0 | O | | | | |
| INT1 | | O | | | |
| INT2 | | | O | | |
| INT3 | | O | | | |
| INT4 | O | | | | |
| INT5 | | | | O | |
| INT6 | | | | | O |

Fig. 5

| | MAINRUN | MAINHALT | SUBRUN | SUBHALT | STOP |
|---|---|---|---|---|---|
| CLOCK OSCILLATION BY MAIN OSCILLATOR | ON | ON | OFF | OFF | OFF |
| CLOCK OSCILLATION BY SUB OSCILLATOR | ON | ON | ON | ON | OFF |
| CLOCK SUPPLY TO CPU | HIGH-CLOCK | STOP | LOW-CLOCK | STOP | STOP |
| CURRENT CONSUMPTION MODE OF PERIPHERAL MACRO | HIGH | LOW | LOW | LOW | LOW |
| CURRENT CONSUMPTION MODE OF INTERNAL REGULATOR | HIGH | LOW | LOW | LOW | LOW |

Fig. 6

MICROCOMPUTER AND CONTROL METHOD THEREOF

CROSS-REFERENCE TO RELATED APPLICATIONS

This application is based upon and claims the benefit of priority from Japanese patent application No. 2010-068069, filed on Mar. 24, 2010, the disclosure of which is incorporated herein in its entirety by reference.

BACKGROUND

The present invention relates to a microcomputer and a control method thereof, and in particular a microcomputer and a control method thereof performing the transition of an operational mode.

A microcomputer, in general, has a plurality of operational modes. The operational modes include, for example, a RUN mode, a STANDBY mode and the like. The RUN mode is a mode of executing a usual processing. The STANDBY mode consumes lower current than the RUN mode. The RUN mode includes operational modes according to a plurality of different operation clocks for a CPU (Central Processing Unit). For example, the RUN mode includes a MAINRUN mode, a SUBRUN mode and the like. The MAINRUN mode makes the microcomputer to execute the maximum performance by using a high-speed clock. The SUBRUN mode makes the microcomputer to execute the minimum performance by using a low-speed clock. The STANDBY mode includes, for example, a STOP mode, a HALT mode and the like. The STOP mode minimizes current consumption by stopping the generation of the clock. The HALT mode suppresses current consumption by stopping the supply of the clock to the CPU, thereby enabling a high-speed return to the RUN mode.

For example, the microcomputer transits from the RUN mode to the HALT mode by a command of the CPU, when there is no operational request for the microcomputer for a predetermined period. Further, the microcomputer transits from the HALT mode to the RUN mode, by supplying the CPU with current by an interruption request or the like, when the microcomputer returns to enable to execute the usual processing. That is, the microcomputer returns from the STANDBY mode.

Japanese Unexamined Patent Application Publication No. 1-260517 discloses a technique relating to a microcomputer to transit an operational mode between a plurality of RUN modes having different clock sources. The microcomputer in accordance with Japanese Unexamined Patent Application Publication No. 1-260517 includes a selection switching means to switch to a certain clock source among the plurality of clock sources according to a cause of interrupt and to supply the selected clock source to the CPU, when an internal or external interrupt occurs. Further, the microcomputer saves the previous operational mode, when switching to the certain clock source, that is, transiting an operational mode, and transits to the saved operational mode, when returning from an interruption processing.

Now, an operational example of the microcomputer in accordance with Japanese Unexamined Patent Application Publication No. 1-260517 is explained. First, the microcomputer saves a clock source of a first RUN mode, when it transits from the first RUN mode to a second RUN mode by an interrupt routine. Further, the CPU executes the interrupt routine by a clock source of the second RUN mode. The CPU returns to the saved clock source of the first RUN mode by executing a return command at the end of the interrupt routine. Herewith, it enables to perform execution on the first RUN mode.

SUMMARY

Originally, the necessity for suppressing current consumption in the area of the microcomputer is higher than that in the area of a general purpose computer. Further, recently, there has been a strong demand for further current consumption. Therefore, the necessity to suppress current consumption has risen, not only by the transition to the STANDBY mode, but also in a processing itself to transit an operational mode.

However, it is necessary to operate the CPU for the processing to transit the operational mode. That is, it is necessary to transit to an intended operational mode by executing a command of a memory access or SFR writing. Therefore, there is a problem that it is difficult to suppress current consumption along with a transition of the operational mode.

FIG. 12 is a timing diagram illustrating an occurrence of the problem described above. FIG. 12 shows a case to transit from the HALT mode to the STOP mode, as an example to transit from one STANDBY mode to another STANDBY mode. In particular, it shows the case to transit from the SUBRUN mode to the SUBHALT mode, and the SUBHALT mode to the STOP mode. First, at the SUBRUN mode, it transits to the SUBHALT mode by the HALT command from the CPU. Further, it temporarily returns from the SUBHALT mode to the MAINRUN mode by the interruption request and the like. Furthermore, at the MAINRUN mode, it transits to the STOP mode by the STOP command from the CPU. In this case, a current consumption of the CPU to transit the operational mode is rather needed although the transition is made from one STANDBY mode to another STANDBY mode for suppressing current consumption, originally.

Furthermore, Japanese Unexamined Patent Application Publication No. 1-260517 does not assume returning from the STANDBY mode not supplying the clock to the CPU. If the microcomputer according to Japanese Unexamined Patent Application Publication No. 1-260517 transits from the RUN mode to the STANDBY mode, and returns from the STANDBY mode by the interruption signal, it needs to transit to the previous RUN mode. That is, the operational mode becomes the previous RUN mode without exception, when it returns from the STANDBY mode.

In a microcomputer and a control method thereof according to the first and second exemplary aspects of the present invention, the control circuit determines, in each case, a mode to which the CPU should transit from a STANDBY mode according to a type of an interruption request to the CPU, when a mode of the CPU is the STANDBY mode. Therefore, it can transit to a proper operational mode. Furthermore, also when a mode of the CPU is a normal mode, the similar operation is performed.

According to the present invention, it is possible to provide a microcomputer and a control method thereof that are capable of suppressing current consumption according to the transition of a mode of a CPU.

BRIEF DESCRIPTION OF THE DRAWINGS

The above and other aspects, advantages and features will be more apparent from the following description of certain embodiments taken in conjunction with the accompanying drawings, in which:

FIG. 5 is an example of correspondence of the cause of interrupt and the operational mode according to the second exemplary embodiment of the present invention;

FIG. 6 is an example of a combination of a control content of a clock control circuit of each operational mode according to the second exemplary embodiment of the present invention;

DETAILED DESCRIPTION

Figure 1:
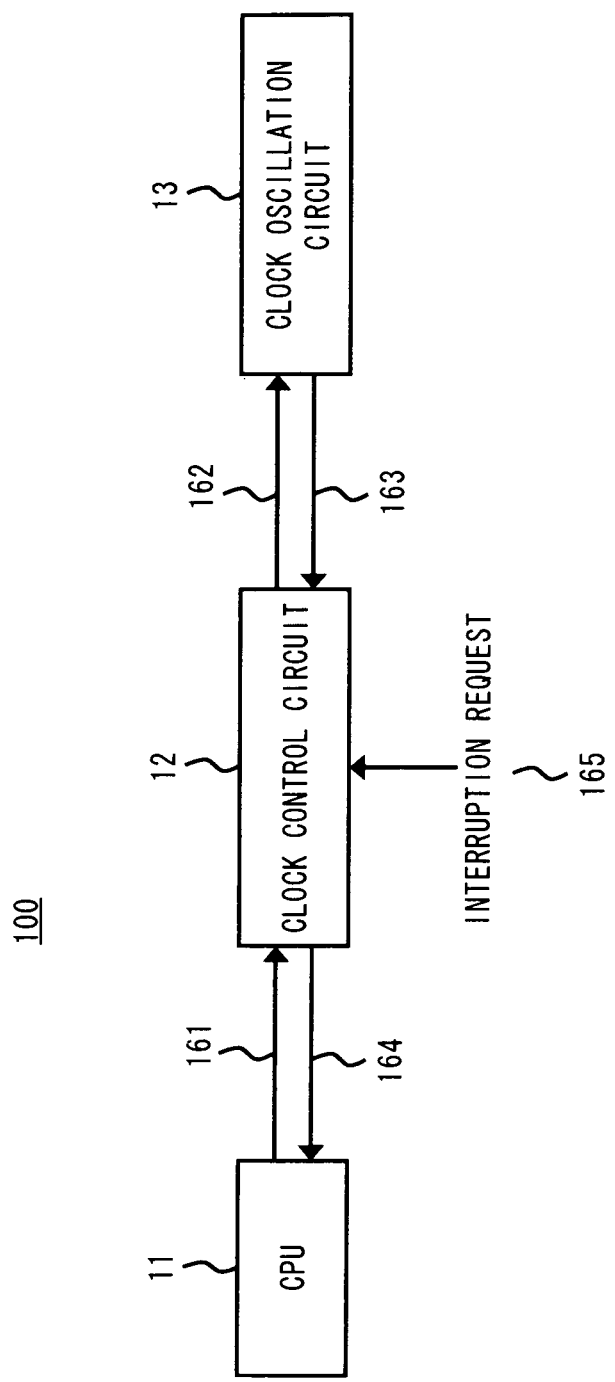
FIG. 1 is a block diagram showing a configuration of a microcomputer according to a first exemplary embodiment of the present invention.

Hereinafter, specific embodiments to which the present invention is applied will be described in detail with reference to the accompanying drawings. In the drawings, the same components are denoted by the same reference symbols, and redundant explanation thereof is omitted as appropriate to clarify the explanation.

First Exemplary Embodiment

FIG. 1 is a block diagram showing a configuration of a microcomputer 100 according to a first exemplary embodiment of the present invention. The microcomputer 100 is able to operate by switching a plurality of operational modes. For example, it is assumed that the operational modes include a RUN mode and a STANDBY mode. The RUN mode is a mode to execute a usual processing. The STANDBY mode consumes lower current than the RUN mode. Further, for example, the STANDBY mode includes a STOP mode and a HALT mode. The STOP mode is a mode to minimize current consumption by stopping the generation of the clock. The HALT mode is a mode to suppress current consumption by stopping a clock supply to a CPU (Central Processing Unit), thereby enabling a high-speed return to the RUN mode. That is, at least the clock supply to the CPU is stopped by the STANDBY mode. Note that, the microcomputer 100 may have an operational mode other than the above described operational modes.

The microcomputer 100 includes a CPU 11, a clock control circuit 12, and a clock oscillation circuit 13. The CPU 11 is a control apparatus that performs controlling to another apparatus (not shown) of the microcomputer 100, or calculating and converting data and the like. Further, the CPU 11 at least has the RUN mode and the STANDBY mode. The CPU 11 sends a standby request 161, to suppress current consumption of the microcomputer 100, to the clock control circuit 12. The standby request 161 is a signal to request a transition to the STANDBY mode. In particular, the standby request 161 is a signal to request a transition to the HALT mode or the STOP mode. Further, the CPU 11 operates according to a clock signal 164 supplied from the clock control circuit 12. Other functions of the CPU 11 according to the first exemplary embodiment of the present invention are not described in detail, because well-known one can be used.

The clock oscillation circuit 13 is an electrical circuit to generate a clock pulse. That is, the clock oscillation circuit 13 is a clock generation circuit to generate a clock supplied to the CPU 11. The clock oscillation circuit 13 performs an operation according to a clock oscillation control signal 162 from the clock control circuit 12. For example, the clock oscillation circuit 13 starts generating a clock pulse, when the clock oscillation control signal 162 indicates an instruction to start the operation. Further, the clock oscillation circuit 13 stops generating the clock pulse, when the clock oscillation control signal 162 indicates an instruction to stop the operation. Furthermore, the clock oscillation circuit 13 outputs the generated clock pulse as a clock signal 163 to the clock control circuit 12. Other functions of the clock oscillation circuit 13 according to the first exemplary embodiment of the present invention are not described in detail, because well-known one can be used.

The clock control circuit 12 supplies the clock signal 163 received from the clock oscillation circuit 13 as a clock signal 164 to the CPU 11 at the RUN mode. Further, when the clock control circuit 12 receives the standby request 161 from the CPU 11, the clock control circuit 12, at least, stops a clock supply to the CPU 11, and makes the microcomputer 100 to transit to the STANDBY mode. For example, when the standby request 161 is a signal to request a transition to the HALT mode, the clock control circuit 12 stops an output of the clock signal 164 to the CPU 11. Herewith, the CPU 11 stops an operation, and a current of the microcomputer 100 is not consumed. Further, when the standby request 161 is a signal to request a transition to the STOP mode, the clock control circuit 12 stops an output of the clock signal 164 to the CPU 11, and outputs the clock oscillation control signal 162 indicating an instruction to stop the operation to the clock oscillation circuit 13. Herewith, current consumption of the CPU 11 and the like can be suppressed, because the clock oscillation circuit 13 does not perform a processing to generate the clock pulse.

Further, the clock control circuit 12 monitors a mode of the CPU 11, and determines an operational mode according to the mode of the CPU 11 and a cause of interrupt which is a type of an interruption request, when the interruption request 165 occurs. For example, first, when the interruption request 165 occurs at an internal or external apparatus (not shown) of the microcomputer 100, the clock control circuit 12 extracts the cause of interrupt included in the interruption request 165, and determines the operational mode according to the extracted cause of interrupt. For example, a different operational mode for each cause of interrupt may be set in advance.

Furthermore, the clock control circuit 12 controls a clock supply to the CPU 11 and an operation of the clock oscillation circuit 13 based on the determined operational mode. For example, when the determined operational mode is the RUN mode, the clock control circuit 12 supplies the clock signal 163 received from the clock oscillation circuit 13 as the clock signal 164 to the CPU 11. Further, when the determined operational mode is the HALT mode, the clock control circuit 12 stops an output of the clock signal 164 to the CPU 11. Moreover, when the determined operational mode is the STOP mode, the clock control circuit 12 stops an output of the clock signal 164 to the CPU 11, and outputs the clock oscillation control signal 162 indicating an instruction to stop operation to the clock oscillation circuit 13. That is, the clock control circuit 12 is a control circuit that monitors a mode of the CPU 11, determines a mode to which the CPU 11 should transit according to the mode of the CPU 11 and a type of the interruption request 165 to the CPU 11, and controls the clock oscillation circuit 13 according to the determined mode.

Figure 2:
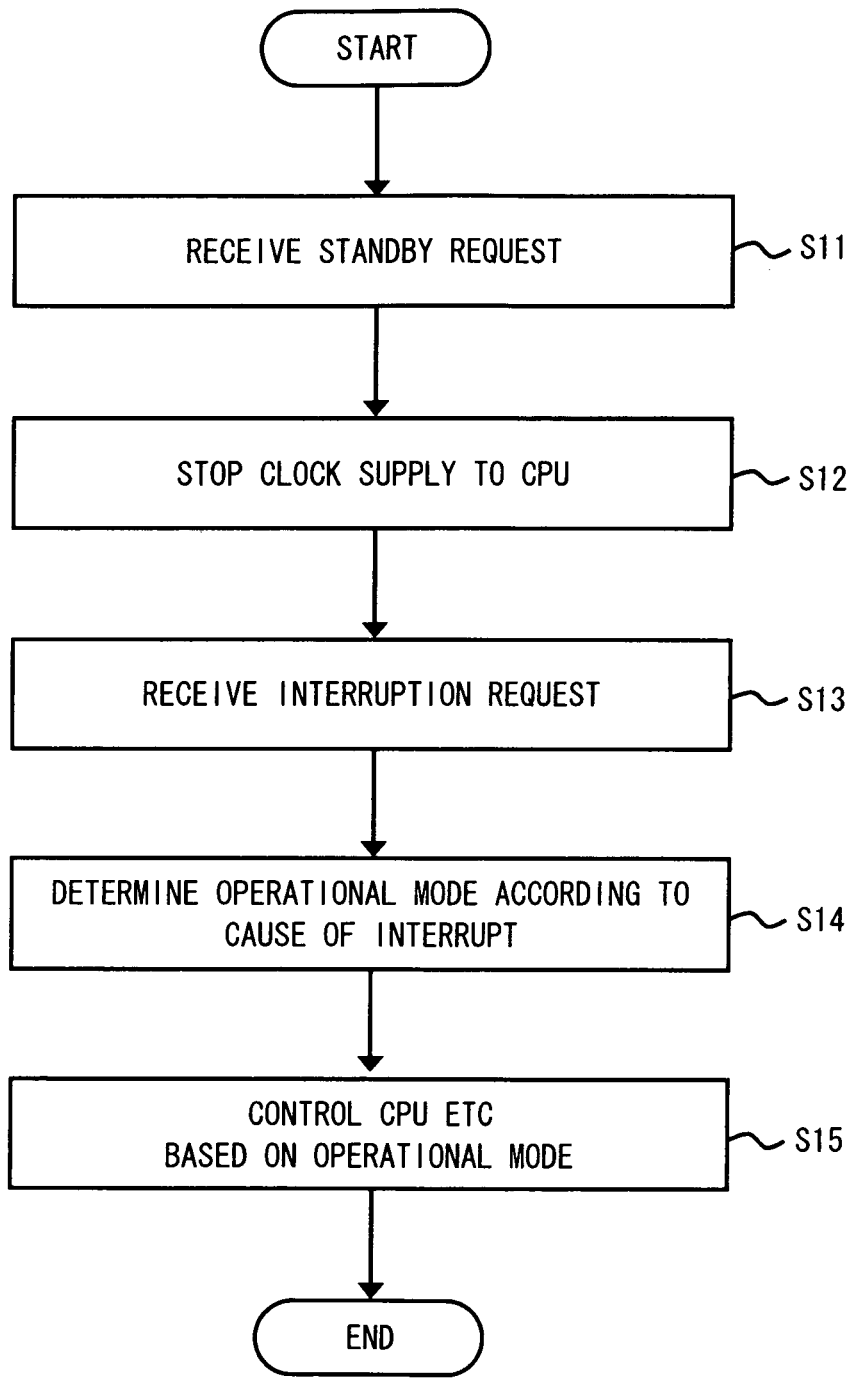
FIG. 2 is a flowchart showing the flow of processing of a clock control circuit according to the first exemplary embodiment of the present invention.

FIG. 2 is a flowchart showing the flow of processing of the clock control circuit 12 according to the first exemplary embodiment of the present invention. It is assumed that the microcomputer 100 operates at the RUN mode. That is, it is assumed that the clock oscillation circuit 13 generates a clock pulse and that the CPU 11 operates by the clock signal 164.

First, the clock control circuit 12 receives the standby request 161 from the CPU 11 (S11). For example, the clock control circuit 12 receives a request of a transition to the HALT mode as the standby request 161. Second, the clock control circuit 12 stops a clock supply to the CPU 11 (S12). That is, the clock control circuit 12 stops an output of the clock signal 164 to the CPU 11, as presented above. Note that, the clock oscillation circuit 13 operates, but a current of the CPU 11 is not consumed, because a clock is not supplied to the CPU 11. Herewith, the microcomputer 100 transited to the HALT mode which is one of the STANDBY modes.

After that, the clock control circuit 12 receives the interruption request 165 (S13). For example, it assumes that an interruption request occurs from an internal timer (not shown) or the like of the microcomputer 100. Subsequently, the clock control circuit 12 determines an operational mode according to a cause of interrupt (S14). For example, the clock control circuit 12 determines the STOP mode as the operational mode, when it is set that it transits to the STOP mode in case of the cause of interruption being a timer interruption. Further, the clock control circuit 12 controls the CPU and the like based on the operational mode (S15). In this case, the clock control circuit 12 outputs the clock oscillation control signal 162 indicating an instruction to stop the operation to the clock oscillation circuit 13, because the determined operational mode is the STOP mode. Herewith, the operation of the clock oscillation circuit 13 stops, thereby it can suppress current consumption in other internal apparatuses of the microcomputer 100.

That is, the clock control circuit 12 can determine the STOP mode to the operational mode. The stop mode is the STANDBY mode different from the HALT mode which is the STANDBY mode transited when it receives the standby request 161. Herewith, it transits directly from one STANDBY mode to another STANDBY mode not through the RUN mode, thereby it can minimize current consumption.

As described above, according to the first exemplary embodiment of the present invention, it can suppress current consumption according to the transition of a mode of a CPU. In particular, it transits directly to a predetermined operational mode not through the CPU 11, when it returns from the STANDBY mode. Therefore, it can suppress current consumption according to the transition of an operational mode from the STANDBY mode. Further, it is not necessary to transit temporarily to the RUN mode to make the microcomputer 100 to transit the operational mode when it returns from the STANDBY mode, thereby it is possible to shorten time of the transition of an operational mode.

Second Exemplary Embodiment

Figure 3:
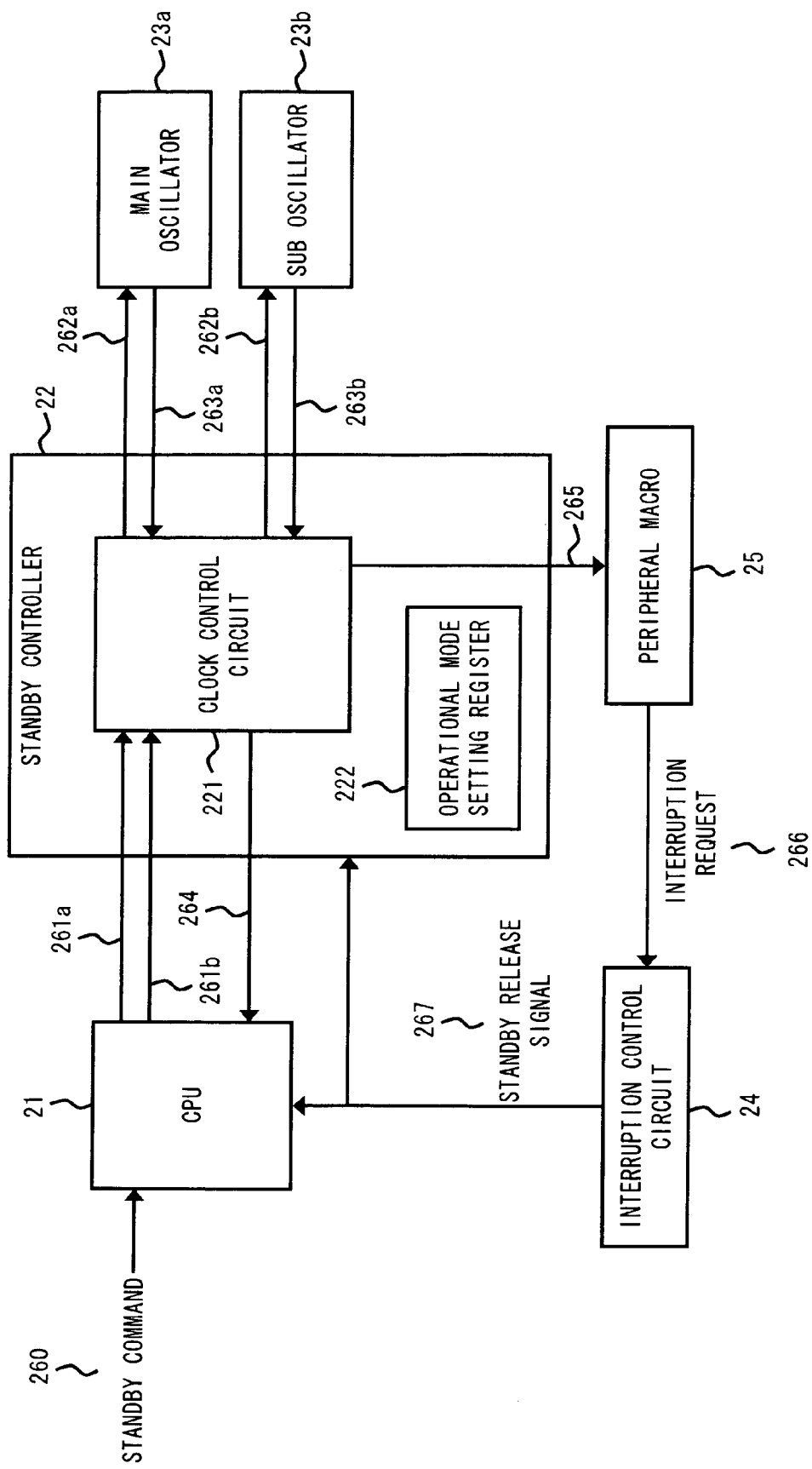
FIG. 3 is a block diagram showing a configuration of a microcomputer according to a second exemplary embodiment of the present invention.

FIG. 3 is a block diagram showing a configuration of a microcomputer 200 according to a second exemplary embodiment of the present invention. The microcomputer 200 includes a CPU 21, a standby controller 22, a main oscillator 23a, a sub oscillator 23b, an interruption control circuit 24, and a peripheral macro 25. The microcomputer 200 is able to operate by switching a plurality of operational modes. For example, it is assumed that the operational modes include a MAINRUN mode, a SUBRUN mode, a MAINHALT mode, a SUBHALT mode, and a STOP mode.

The MAINRUN mode is an operational mode to make the microcomputer 200 to execute the maximum performance by operating the CPU 21 by using a high-speed clock. The SUBRUN mode is an operational mode to make the microcomputer 200 to execute the minimum performance by operating the CPU 21 by using a clock whose speed is lower than that of the MAINRUN mode. The MAINHALT mode is an operational mode to stop a clock supply to the CPU 21, but to continue operations of the main oscillator 23a and the sub oscillator 23b which are clock oscillation circuits. Herewith, it can return to the MAINRUN mode with high speed. The SUBHALT mode is an operational mode to stop a clock supply to the CPU 21 in the similar way as the MAINHALT mode, and to stop the operation of the main oscillator 23a. At the same time, the SUBHALT mode makes an operation of the sub oscillator 23b to continue. The STOP mode is an operational mode to stop a clock supply to the CPU 21, and to stop the operations of the main oscillator 23a and the sub oscillator 23b. Note that, the microcomputer 200 may have an operational mode other than the above described operational modes.

The CPU 21 receives a standby command 260 from outside, and sends to the standby controller 22 either HALT status signal 261a or a STOP status signal 261b according to a content of the standby command 260. The standby command 260 is either a HALT command to request a transition to the HALT mode or a STOP command to request a transition to the STOP mode. In particular, when the CPU 21 receives the standby command 260 which is the HALT command, the CPU 21 sends the HALT status signal 261a to the standby controller 22. When the CPU 21 receives the standby command 260 which is the STOP command, the CPU 21 sends the STOP status signal 261b to the standby controller 22.

Further, the CPU 21 operates according to a clock signal 264 supplied from the standby controller 22. Furthermore, the CPU 21 receives a standby release signal 267 from the interruption control circuit 24. When the CPU 21 receives the standby release signal 267, and the CPU 21 is supplied with the clock signal 264, the CPU 21 can perform a predetermined interruption process. Other functions of the CPU 21 according to the second exemplary embodiment of the present invention are not described in detail, because well-known one can be used.

The main oscillator 23a is an electrical circuit to generate a high-speed clock pulse, that is, a clock oscillation circuit. The main oscillator 23a performs an operation according to a clock oscillation control signal 262a from the standby controller 22. For example, the main oscillator 23a starts generating a high-speed clock pulse, when the clock oscillation control signal 262a indicates an instruction to start the operation. Further, the main oscillator 23a stops generating the clock pulse, when the clock oscillation control signal 262a indicates an instruction to stop the operation. Furthermore, the main oscillator 23a outputs the generated clock pulse as a clock signal 263a to the standby controller 22.

The sub oscillator 23b is an electrical circuit to generate a clock pulse whose speed is lower than that of the main oscillator 23a, that is, a clock oscillation circuit. The sub oscillator 23b performs an operation according to a clock oscillation control signal 262b from the standby controller 22. For example, the sub oscillator 23b starts generating a low-speed clock pulse, when the clock oscillation control signal 262b indicates an instruction to start the operation. Further, the sub oscillator 23b stops generating the clock pulse, when the clock oscillation control signal 262b indicates an instruction to stop the operation. Furthermore, the sub oscillator 23b outputs the generated clock pulse as a clock signal 263b to the standby controller 22.

Other functions of the main oscillator 23a and the sub oscillator 23b according to the second exemplary embodiment of the present invention are not described in detail, because well-known one can be used.

The peripheral macro 25 is an apparatus that needs current consumption besides the current consumption required by the CPU 21 included in the microcomputer 200. For example, the peripheral macro 25 is a timer, a RAM (Random Access Memory), a flash memory, or the like. The peripheral macro 25 performs an operation according to a clock signal 265 supplied from the standby controller 22. The peripheral macro 25 receives an instruction or the like to set a current consumption mode high or low from the standby controller 22, the current consumption mode being a mode which consumes current, and changes a consumption degree of the current according to the instruction. The peripheral macro 25 generates an interruption request 266 by the timer or the like, and sends it to the interruption control circuit 24. For example, the peripheral macro 25 generates the interruption request 266, when the microcomputer 200 is the HALT mode. The peripheral macro 25 can generate the interruption request 266 based on a request from the outside, regardless of the operational mode of the microcomputer 200. Other functions of the peripheral macro 25 according to the second exemplary embodiment of the present invention are not described in detail, because well-known one can be used.

The interruption control circuit 24 performs a predetermined process to the interruption request 266 input from the peripheral macro 25, and outputs the processed request as a standby release signal 267 to the CPU 21 and the standby controller 22. The standby release signal 267 is a signal to instruct returning from the STANDBY mode. Note that, the standby release signal 267 in accordance with the second exemplary embodiment of the present invention is a signal including a cause of interrupt in the interruption request 266. Therefore, the standby release signal 267 includes an instruction to transit from the STANDBY mode to another operational mode. Note that, the interruption control circuit 24 in accordance with the second exemplary embodiment of the present invention may output the standby release signal 267 to the CPU 21 and the standby controller 22, even if the microcomputer 200 is not the STANDBY mode.

Figure 4:
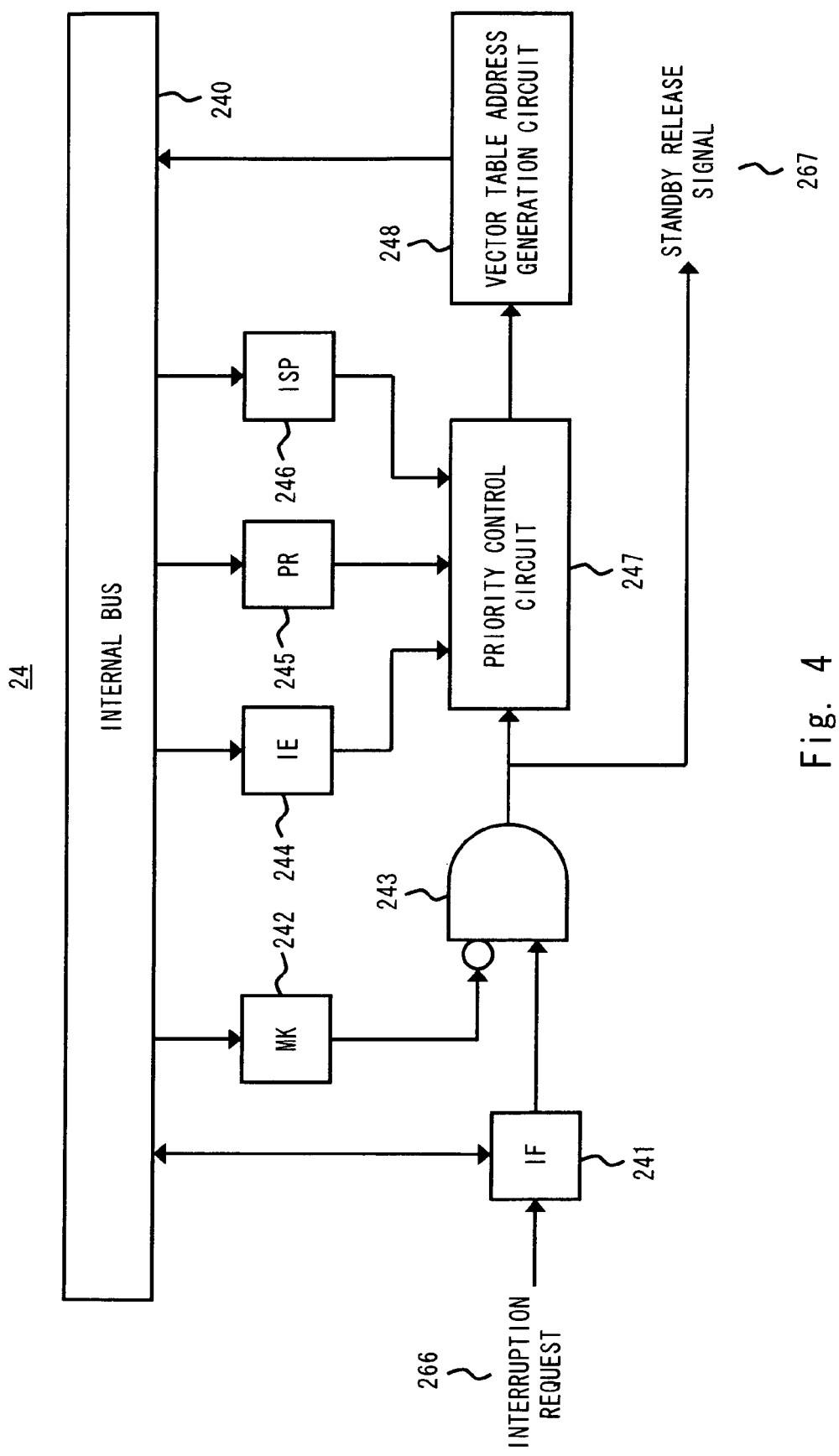
FIG. 4 is a block diagram showing an example of a configuration of an interruption control circuit 24 according to the second exemplary embodiment of the present invention.

FIG. 4 is a block diagram showing an example of a configuration of the interruption control circuit 24 according to the second exemplary embodiment of the present invention. The interruption control circuit 24 includes an internal bus 240, an interruption request flag register (IF) 241, an interruption mask flag register (MK) 242, an AND circuit 243, an interruption enable flag register (IE) 244, a priority level specification flag register (PR) 245, a in-service priority flag register (ISP) 246, a priority control circuit 247, and a vector table address generation circuit 248.

The internal bus 240 is a data bus to connect the IF 241, the MK 242, the IE 244, the PR 245, the ISP 246, and the vector table address generation circuit 248. The IF 241 is a register to store the interruption request 266 input from the peripheral macro 25. The MK 242 is a register to store a value to mask a value stored in the IF 241. The AND circuit 243 carries out the logical AND between the value stored in the IF 241 and an inversion result of the value stored in the MK 242, and outputs the logical AND result as the standby release signal 267. That is, the standby release signal 267 is a signal obtained by performing a predetermined conversion on the interruption request 266. Therefore, the standby release signal 267 includes a cause of interrupt in the interruption request 266. Additionally, the AND circuit 243 outputs the standby release signal 267 to the priority control circuit 247.

The IE 244 is a register to store a value indicating whether to make another interruption request disable or not. The PR 245 is a register to store a flag to specify a priority level. The ISP 246 is a register to store a flag to specify a priority level of an in-service. The priority control circuit 247 performs a process to the standby release signal 267 input from the AND circuit 243 by using the IE 244, the PR 245, and the ISP 246, and outputs the processed result to the vector table address generation circuit 248.

The vector table address generation circuit 248 is a circuit including a memory area which is a vector table in which with a cause of interrupt is associated with an address of a process based on the cause of interrupt. The vector table address generation circuit 248 selects an address based on a process result input from the priority control circuit 247, that is, the cause of interrupt, and outputs the selected address to the internal bus 240.

Note that, compositions of the interruption control circuit 24 according to the second exemplary embodiment of the present invention are not limited to the one shown in the FIG. 4. Other functions of the interruption control circuit 24 according to the second exemplary embodiment of the present invention are not described in detail, because well-known one can be used.

Referring back to FIG. 3, the standby controller 22 is a concrete composition example of the clock control circuit 12 according to the first exemplary embodiment of the present invention described above. The standby controller 22 is a control circuit to control the CPU 21, the main oscillator 23a, the sub oscillator 23b, and the peripheral macro 25 according to the HALT status signal 261a or the STOP status signal 261b from the CPU 21, and to make the microcomputer 200 to transit to the STANDBY mode. The standby controller 22 determines an operational mode according to the standby release signal 267 input from the interruption control circuit 24 at the STANDBY mode, and controls the CPU 21, the main oscillator 23a, the sub oscillator 23b, and the peripheral macro 25 based on the determined operational mode. Herewith, it can make the microcomputer 200 to transit to a desired operational mode.

The standby controller 22 includes a clock control circuit 221, and an operational mode setting register 222. The clock control circuit 221 supplies the clock signal 263a input from the main oscillator 23a as the clock signal 264 to the CPU 21 in the MAINRUN mode. The clock control circuit 221 supplies the clock signal 263b input from the sub oscillator 23b as the clock signal 264 to the CPU 21 in the SUBRUN mode. Note that, in any case, the clock control circuit 221 supplies the clock signal 263b input from the sub oscillator 23b as the clock signal 265 to the peripheral macro 25.

Further, when the clock control circuit 221 receives the HALT status signal 261a from the CPU 21, the clock control circuit 221 stops a clock supply to the CPU 21, and makes the microcomputer 200 to transit to the STANDBY mode. At this time, when the microcomputer 200 is in the MAINRUN mode, the clock control circuit 221 makes the microcomputer 200 to transit to the MAINHALT mode. When the microcomputer 200 is in the SUBRUN mode, the clock control circuit 221 makes the microcomputer 200 to transit to the SUBHALT mode. When the clock control circuit 221 receives the STOP status signal 261b from the CPU 21, the clock control circuit 221 stops the clock supply to the CPU 21 and the peripheral macro 25, and outputs the clock oscillation control signal 262a and the clock oscillation control signal 262b indicating an instruction to stop the operation to the main oscillator 23a and the sub oscillator 23b. Note that, in any case, the clock control circuit 221 outputs the instruction to set a current consumption mode low to the peripheral macro 25.

The operational mode setting register 222 is a memory area to store a cause of interrupt and an operational mode, in advance while being associated with each other. That is, the standby controller 22 holds correspondence information in which the mode of the CPU 21, a type of the interruption request, and the mode to which the CPU 21 should transit are associated with one another. FIG. 5 is an example of correspondence of the cause of interrupt and the operational mode according to the second exemplary embodiment of the present invention. In FIG. 5, the causes of interrupt are INT0, INT1, ..., and INT6 as an example. For example, it shows that an operational mode corresponding to the INT0 is the MAINRUN mode, and an operational mode corresponding to the INT1 is the MAINHALT mode and so on. Herewith, it can define the transition to an arbitrary mode, thereby it can flexibly correspond to an operational change. For example, when the microcomputer 200 is in the SUBHALT mode, and the cause of interrupt is a timer interruption, it can set to correspond to the SUBRUN mode. When the microcomputer 200 is the SUBHALT mode, and the cause of interrupt is an interruption by receiving LINUART, it can set to correspond to the MAINRUN mode. Alternatively, it can make the microcomputer 200 to transit to different modes depending on whether the cause of interrupt is a regular interruption by a timer or a WDT (WatchDog Timer) or an interruption by a voltage decrease. That is, the standby controller 22 holds different modes to which the CPU 21 should transit, depending on whether the interruption request is generated regularly or suddenly.

Referring back to FIG. 3, the clock control circuit 221 selects an operational mode from the operational mode setting register 222, the operational mode corresponding to the cause of interrupt in the standby release signal 267 input from the interruption control circuit 24. That is, when the clock control circuit 221 receives the standby release signal 267, the clock control circuit 221 refers to the operational mode setting register 222, and determines an operational mode according to the cause of interrupt included in the standby release signal 267. Further, the clock control circuit 221 controls the clock supply to the CPU 21 and the peripheral macro 25, the operations of the main oscillator 23a and the sub oscillator 23b, and the current consumption mode of the peripheral macro 25 based on the operational mode that is determined.

FIG. 6 is an example of a combination of a control content of a clock control circuit for each operational mode according to the second exemplary embodiment of the present invention. First, a control of the clock control circuit 221 when the determined operational mode is the MAINRUN mode is explained. In this case, the clock control circuit 221 enables the main oscillator 23a to oscillate a clock. That is, the clock control circuit 221 outputs the clock oscillation control signal 262a which is an instruction to start the operation to the main oscillator 23a. In this time, the clock control circuit 221 enables the sub oscillator 23b to oscillate a clock. That is, the clock control circuit 221 outputs the clock oscillation control signal 262b which is an instruction to start the operation to the sub oscillator 23b. In this time, the clock control circuit 221 supplies a high-speed clock to the CPU 21. That is, the clock control circuit 221 outputs the clock signal 263a input from the main oscillator 23a as the clock signal 264 to the CPU 21. In this time, the clock control circuit 221 sets the current consumption mode of the peripheral macro 25 and an internal regulator (not shown) high. That is, the clock control circuit 221 sends the instruction to set the current consumption mode high to the peripheral macro 25 and the internal regulator.

Second, a control of the clock control circuit 221 when the determined operational mode is the MAINHALT mode is explained. In this time, the clock control circuit 221 keeps a clock oscillation by the main oscillator 23a and the sub oscillator 23b. Note that, when one or both of the main oscillator 23a and the sub oscillator 23b do not operate, the clock control circuit 221 performs a process to enable a circuit which does not operate to perform the clock oscillation. In this time, the clock control circuit 221 stops the clock supply to the CPU 21. That is, the clock control circuit 221 does not output the clock signal 264 to the CPU 21. In this time, the clock control circuit 221 sets the current consumption mode of the peripheral macro 25 and the internal regulator low. That is, the clock control circuit 221 sends the instruction to set the current consumption mode low to the peripheral macro 25 and the internal regulator.

Further, a control of the clock control circuit 221 when the determined operational mode is the SUBRUN mode is explained. In this time, the clock control circuit 221 stops a clock oscillation by the main oscillator 23a. That is, the clock control circuit 221 outputs the clock oscillation control signal 262a which is an instruction to stop the operation to the main oscillator 23a. However, the clock control circuit 221 keeps the clock oscillation by the sub oscillator 23b. Note that, when the sub oscillator 23b does not operate, the clock control circuit 221 performs a process to enable the sub oscillator 23b to perform the clock oscillation. In this time, the clock control circuit 221 supplies a low clock to the CPU 21. That is, the clock control circuit 221 outputs the clock signal 263b input from the sub oscillator 23b as the clock signal 264 to the CPU 21.

Subsequently, a control of the clock control circuit 221 when the determined operational mode is the SUBHALT mode is explained. In this time, the clock control circuit 221 controls the clock oscillation of the main oscillator 23a and the sub oscillator 23b in the similar way as the above described SUBRUN mode.

Further, a control of the clock control circuit 221 when the determined operational mode is the STOP mode is explained. In this time, the clock control circuit 221 stops the clock oscillation by the main oscillator 23a and the sub oscillator 23b. That is, the clock control circuit 221 outputs the clock oscillation control signals 262a and 262b which are instructions to stop the operation to the main oscillator 23a and the sub oscillator 23b. However, when the main oscillator 23a and the sub oscillator 23b do not operate, the clock control circuit 221 may not perform a process to stop, in particular.

Note that, when the determined operational mode is the SUBRUN mode, the SUBHALT mode, or the STOP mode, the clock control circuit 221 sets the current consumption modes of the peripheral macro 25 and the internal regulator low, in the similar way as when the determined operational mode is the MAINHALT mode. When the determined operational mode is the SUBHALT mode or the STOP mode, the clock control circuit 221 stops the clock supply to the CPU 21, in the similar way as when the determined operational mode is the MAINHALT mode.

The standby controller 22 according to the second exemplary embodiment of the present invention continues to stop the clock supply to the CPU 21, when the determined operational mode is the STANDBY mode, in particular. Herewith, it can suppress current consumption, at a transition from one STANDBY mode to another STANDBY mode.

Further, the standby controller 22 according to the second exemplary embodiment of the present invention stops the operations of the main oscillator 23a and the sub oscillator 23b when the determined operational mode is the STOP mode. Herewith, at the STANDBY mode, it can directly stop an operation of a clock oscillator circuit, not through the RUN mode. Therefore, it can suppress current consumption, because it is not necessary to perform transition of a redundant operational mode.

Figure 7:
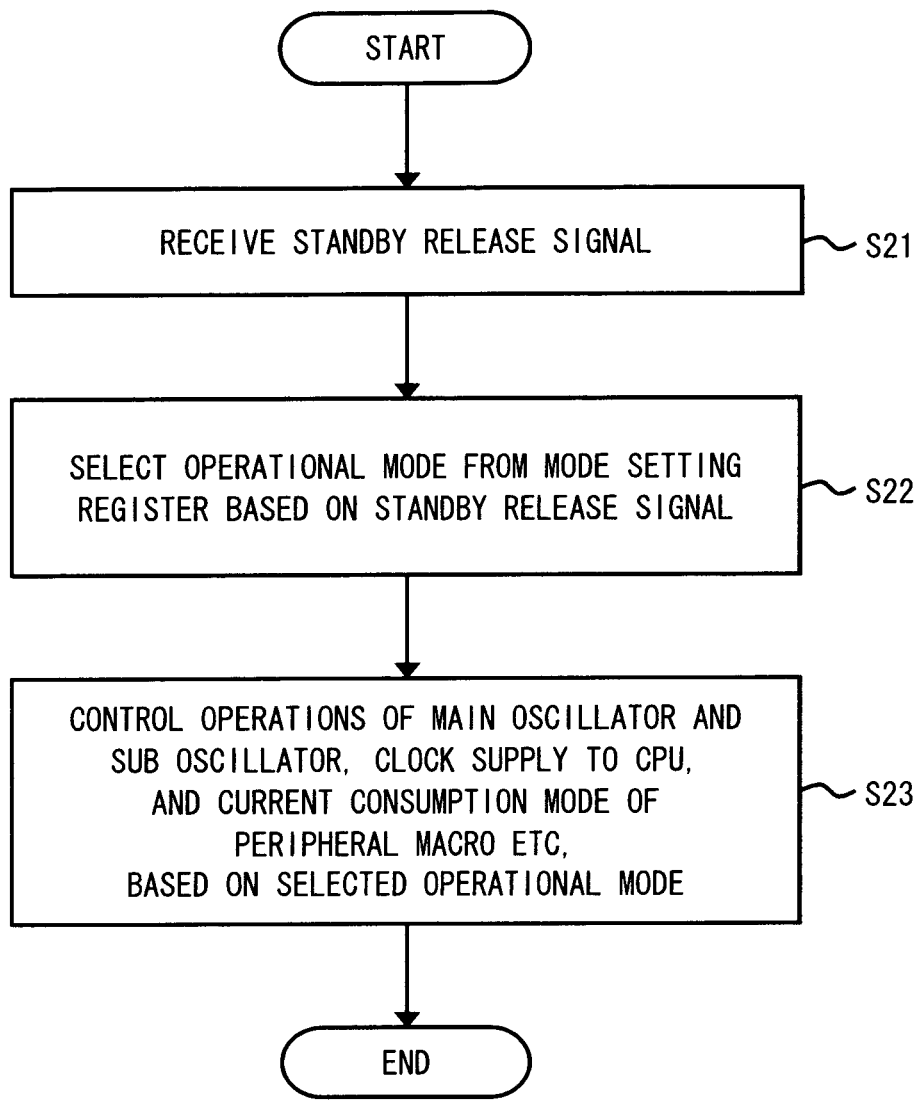
FIG. 7 is a flowchart showing the flow of the clock control circuit according to the second exemplary embodiment of the present invention.

FIG. 7 is a flowchart showing the flow of the clock control circuit 221 according to the second exemplary embodiment of the present invention. It is required that the operational mode setting register 222 preliminarily stores information in which a cause of interrupt and an operational mode are associated with each other, shown in FIG. 5. In this case, it is assumed that a present mode is the MAINRUN mode.

First, the clock control circuit 221 receives the standby release signal 267 (S21). That is, the peripheral macro 25 outputs the interruption request 266, the interruption control circuit 24 performs a predetermined conversion on the interruption request 266, and outputs the standby release signal 267.

Second, the clock control circuit 221 selects an operational mode from the operational mode setting register 222 based on the standby release signal 267 (S22). That is, the clock control circuit 221 extracts a cause of interrupt from the standby release signal 267. The clock control circuit 221 refers to the operational mode setting register 222, and selects information indicating an operational mode corresponding to the extracted cause of interrupt.

After that, the clock control circuit 221 controls the operations of the main oscillator 23a and the sub oscillator 23b, the clock supply to the CPU 21, and the current consumption mode of the peripheral macro 25 or the like, based on the selected operational mode (S23). In particular, the clock control circuit 221 judges the selected operational mode, and performs various controls shown in FIG. 6 according to the judged operational mode.

Figure 8:
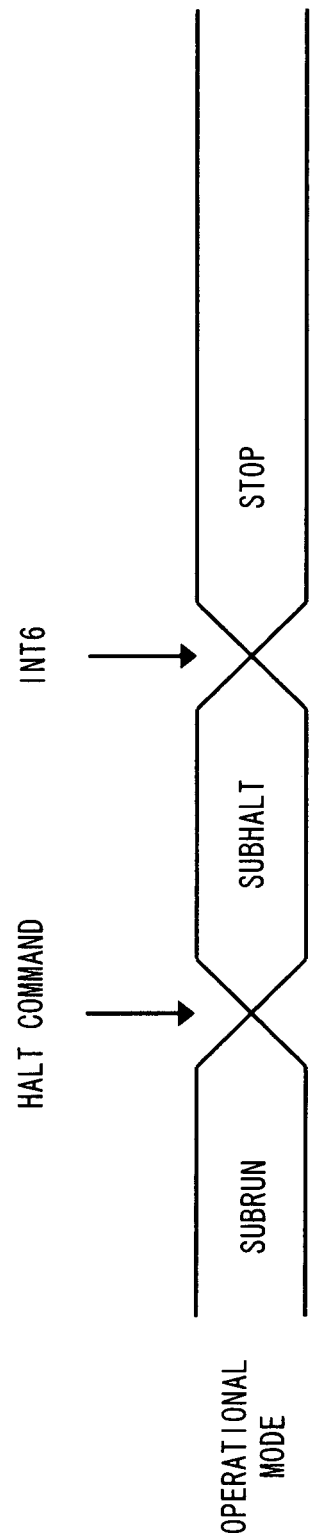
FIG. 8 is a timing diagram showing an example of the operational mode transition according to the second exemplary embodiment of the present invention.
Figure 12:
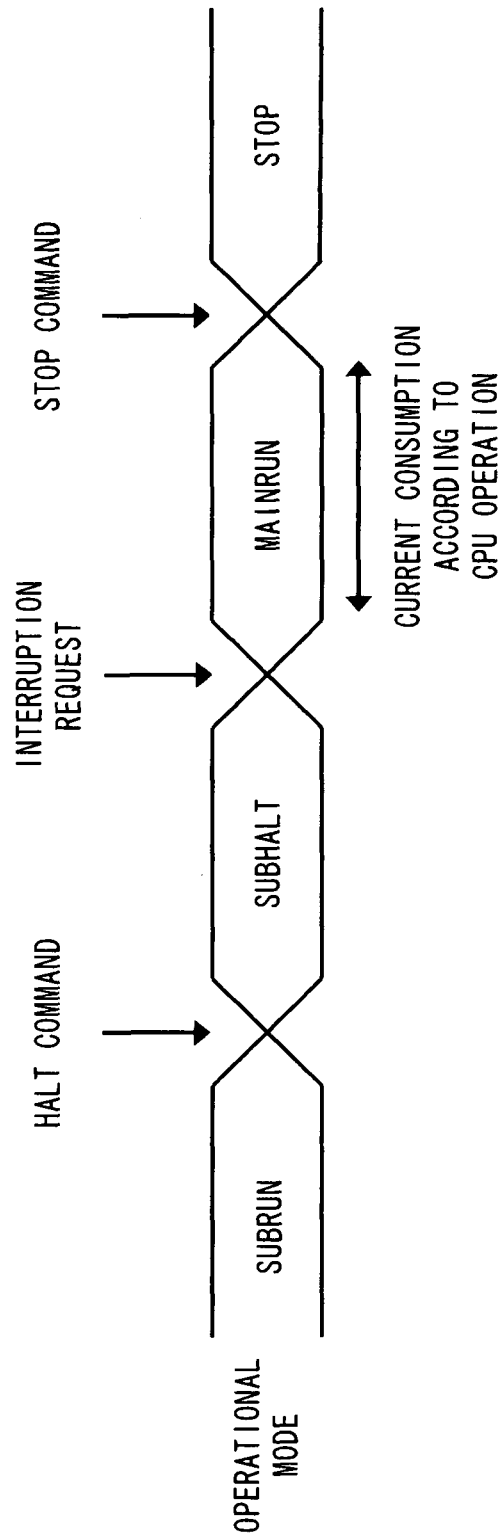
FIG. 12 is a timing diagram illustrating an occurrence of a problem.

FIG. 8 is a timing diagram showing an example of the operational mode transition according to the second exemplary embodiment of the present invention. FIG. 8, similarly to FIG. 12, shows transition from the SUBRUN mode to the SUBHALT mode, and to the STOP mode. First, at the SUBRUN mode, the standby controller 22 transits to the SUBHALT mode by the HALT status signal 261a from the CPU 21. The peripheral macro 25 generates the interruption request 266 whose the cause of interrupt is the INT6, and the interruption control circuit 24 outputs the standby release signal 267 including the INT6. In this time, the clock control circuit 221 receives the standby release signal 267, extracts information of the INT6 from the standby release signal 267, and selects information indicating the STOP mode corresponding to the INT6 from the operational mode setting register 222. After that, the clock control circuit 221 performs the control shown in FIG. 6, and transits to the STOP mode. As understood compared with FIG. 12, in FIG. 8, it does not transit to the MAINRUN mode, thereby it can eliminate unnecessary current consumption. Further, it can eliminate a process time required to transit to the MAINRUN mode, and further to the STOP mode.

Note that, in FIG. 4, an interruption request that is not masked can be used as a standby release signal even if a state of interrupt prohibition, regardless of an operational mode of the microcomputer 200. Therefore, the microcomputer 200 may determine the operational mode by the operational mode setting register 222, when the microcomputer 200 receives the standby release signal 267, even if the microcomputer 200 is not the STANDBY mode. Herewith, it can transit to an arbitrary operational mode, thereby it can flexibly correspond to an operational change.

Figure 9:
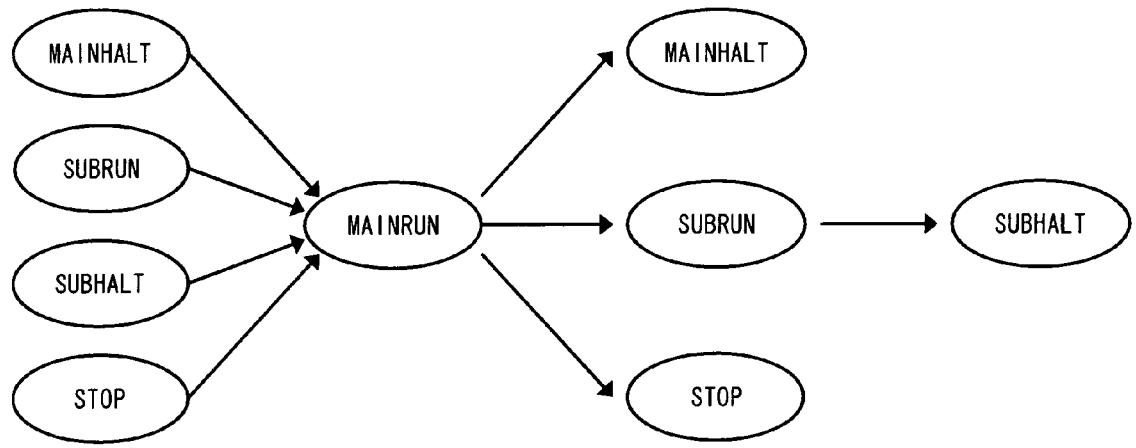
FIG. 9 is a diagram showing a combination of the operational mode transition according to a related art.

Based on the description above, an effect of the second exemplary embodiment of the present invention is explained with reference to FIG. 9 and FIG. 10. FIG. 9 is a diagram showing a combination of the operational mode transition according to a related art. FIG. 9 shows that it must temporarily return to the MAINRUN mode from the MAINHALT mode, the SUBRUN mode, the SUBHALT mode, or the STOP mode, for performing a transition between arbitrary operational modes in the related art shown in FIG. 12. After it returns to the MAINRUN mode, it needs to transit to the MAINHALT mode, the SUBRUN mode, or the STOP mode. It needs to further transit from the SUBRUN mode, for transiting from an arbitrary operational mode to the SUBHALT mode.

Figure 10:
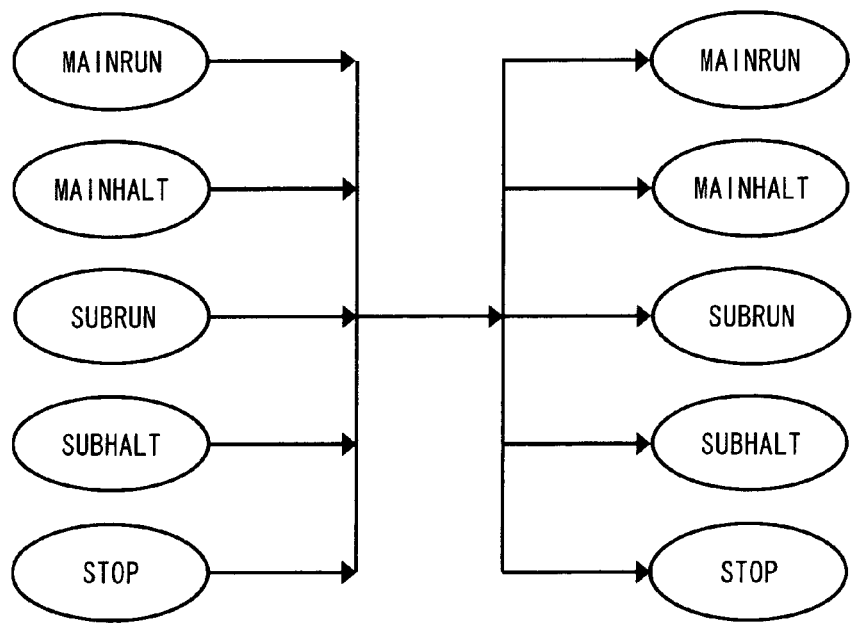
FIG. 10 is a diagram showing a combination of the operational mode transition according to the second exemplary embodiment of the present invention.

By contrast, FIG. 10 is a diagram showing a combination of the operational mode transition according to the second exemplary embodiment of the present invention. FIG. 10 shows that it can transit between arbitrary operational modes, by preliminarily setting a desired operational mode according to a cause of interrupt in the operational mode setting register 222, in the microcomputer 200 according to the second exemplary embodiment of the present invention. That is, it can transit from any one of the MAINRUN mode, the MAINHALT mode, the SUBRUN mode, the SUBHALT mode, or the STOP mode to the MAINRUN mode, the MAINHALT mode, the SUBRUN mode, the SUBHALT mode, or the STOP mode. For example, as described above, in FIG. 9, it can not directly transit from the MAINRUN mode to the SUBHALT mode. Meanwhile, in FIG. 10, it can directly transit from the MAINRUN mode to the SUBHALT mode.

In this way, in the second exemplary embodiment of the present invention, a user preliminarily sets an operational mode in which a process time at returning from the STANDBY mode is minimized for each cause of interrupt in the operational mode setting register 222, thereby it can eliminate an unnecessary transition of the operational mode, and it can realize finer voltage management.

Note that, in FIG. 3, the standby release signal 267 may be output to the CPU 21 through the standby controller 22, instead of being directly output from the interruption control circuit 24 to the CPU 21. In this case, it is assumed that the clock control circuit 221 controls the main oscillator 23a and the sub oscillator 23b, and does not output to the CPU 21 an interruption request to the CPU 21, when a mode of the CPU 21 is the STANDBY mode, and the clock control circuit 221 receives the interruption request to make the CPU 21 to transit to the STANDBY mode.

Herewith, when the mode of the CPU 21 is the normal mode, the clock control circuit 221 outputs an interruption request to the CPU 21, for making the CPU 21 to perform a predetermined interruption process. When the mode of the CPU 21 is one STANDBY mode, and when the clock control circuit 221 receives an interruption request to transit to another STANDBY mode, the clock control circuit 221 does not need to output the interruption request to the CPU 21, because the clock control circuit 221 controls the main oscillator 23a and the sub oscillator 23b by itself without starting up the CPU 21. Therefore, it is possible to suppress current consumption of the CPU, which is one object of the invention.

Third Exemplary Embodiment

The above described second exemplary embodiment of the present invention constantly performs an operational mode transition according to the standby release signal 267. A third exemplary embodiment of the present invention performs the operational mode transition only when the operational modes of before and after are different, and does not perform the operational mode transition when the operational mode of a before transition and an after transition are the same. Therefore, it is possible to control an operation of the standby controller 22, and to suppress further current consumption. Note that, the configuration of the microcomputer according to the third exemplary embodiment of the present invention is similar to that of the second exemplary embodiment of the present invention shown in FIG. 3, and that is not shown and described in detail. In the microcomputer according to the third exemplary embodiment the following improvement is added to the clock control circuit 221 of FIG. 3.

The clock control circuit 221 according to the third exemplary embodiment of the present invention checks a present operational mode, and determines an operational mode according to a cause of interrupt, when an interruption request occurs. After that, the clock control circuit 221 controls a clock supply to the CPU 21 based on the determined operational mode, and operations of the main oscillator 23a and the sub oscillator 23b, only when the checked present operational mode and the determined operational mode are different. In other words, the clock control circuit 221 checks a mode of the CPU 21, and determines a mode to which the CPU 21 should transit according to a type of an interruption request, when the clock control circuit 221 receives the interruption request. After that, the clock control circuit 221 controls the main oscillator 23a and the sub oscillator 23b based on the determined mode to which the CPU 21 should transit, only when the checked mode of the CPU 21 and the determined mode to which the CPU 21 should transit are different. Herewith, when a mode transition is unnecessary even though there is the interruption request, a control of the clock control circuit 221 does not change, thereby it can suppress current consumption.

Figure 11:
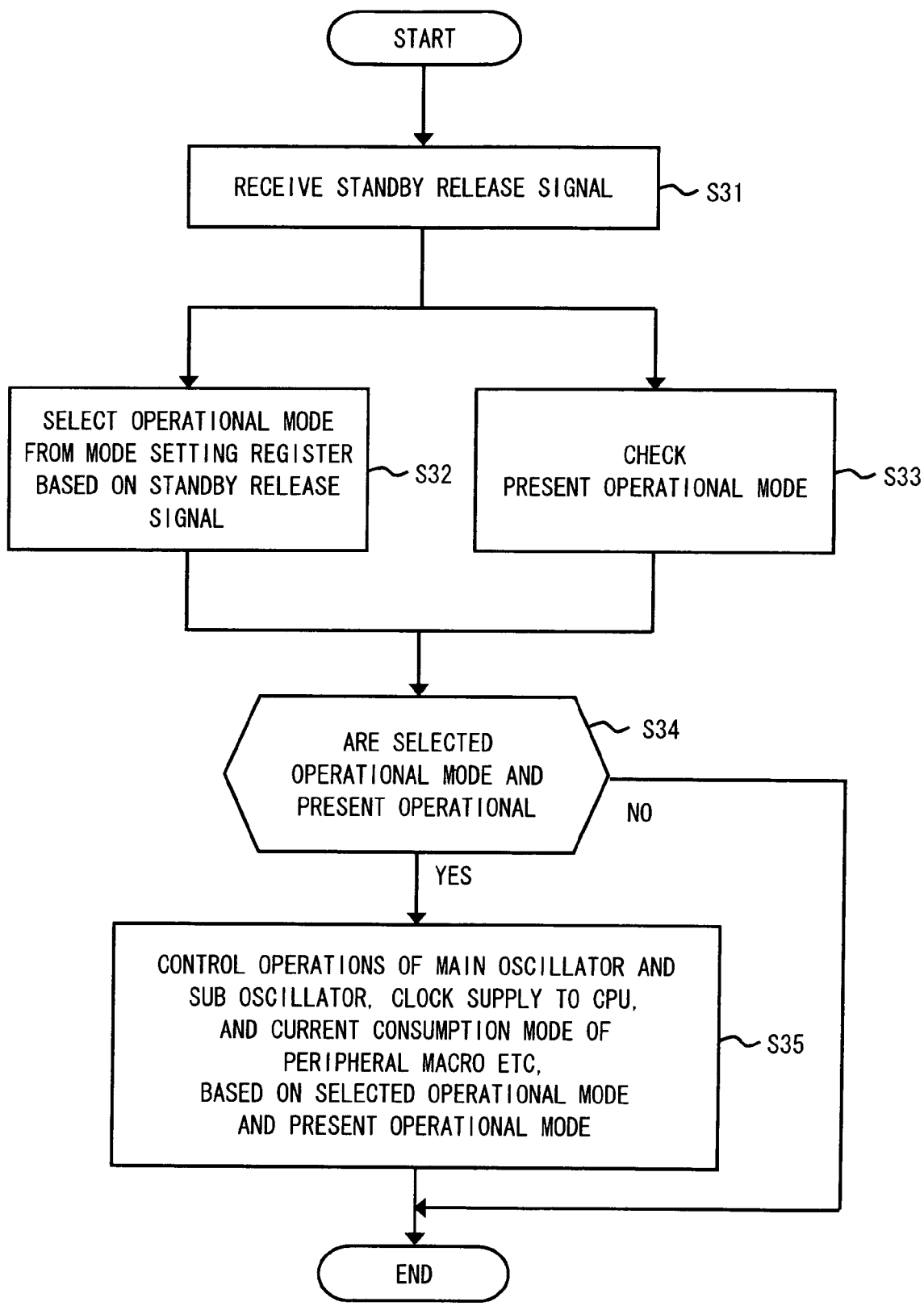
FIG. 11 is a flowchart showing the flow of processing in a clock control circuit according to a third exemplary embodiment of the present invention.

FIG. 11 is a flowchart showing the flow of processing in the clock control circuit 221 according to the third exemplary embodiment of the present invention. It requires the assumption similar to FIG. 7. First, the clock control circuit 221 receives the standby release signal 267 (S31), as is similar to the step S21 of FIG. 7. Second, the clock control circuit 221 selects an operational mode from the operational mode setting register 222 based on the standby release signal 267 (S32), as is similar to the step S22 of FIG. 7.

After the step S31, the clock control circuit 221 checks a present operational mode (S33). For example, the clock control circuit 221 may determine a present operational mode by a state of I/O of the clock signal 264, and the clock signals 263a and 263b.

After that, the clock control circuit 221 determines whether the selected operational mode and the present operational mode are different or not (S34). When the clock control circuit 221 determines that the selected operational mode and the present operational mode are the same, the clock control circuit 221 terminates these processes. That is, in this time, the clock control circuit 221 does not perform a transition of an operational mode. For example, when the present operational mode is the MAINHALT mode, and when the cause of interrupt is the INT1 shown in FIG. 5, the clock control circuit 221 determines the MAINHALT mode. Therefore, a transition of an operational mode is not performed. Accordingly, it can suppress a redundant process of the clock control circuit 221, thereby it can suppress current consumption.

When the clock control circuit 221 determines that the selected operational mode and the present operational mode are different, at the step S34, the clock control circuit 221 controls operations of the main oscillator 23a and the sub oscillator 23b, a clock supply to the CPU 21, and the current consumption mode of the peripheral macro 25, based on the selected operational mode and the present operational mode (S35). In particular, the clock control circuit 221 does not execute the process that is already controlled. Explained in an example of FIG. 6 is a case in which the present operational mode is the MAINHALT mode, and the selected operational mode is the STOP mode. The clock control circuit 221 stops the clock supply to the CPU 21, when the clock control circuit 221 transits to the MAINHALT mode. Therefore, when the clock control circuit 221 transits from the MAINHALT mode to the STOP mode, the clock control circuit 221 does not stop the clock supply to the CPU 21, again. Similarly, the clock control circuit 221 does not change a setting of the current consumption mode of the peripheral macro 25 and the internal regulator, again, because the current consumption modes of the peripheral macro 25 and the internal regulator are set low. Herewith, it can suppress a redundant process of the clock control circuit 221, thereby it can suppress current consumption.

Other Exemplary Embodiments

The standby controller 22 of the second exemplary embodiment of the present invention may check a present operational mode, when an interruption request occurs, and determine an operational mode according to a cause of interrupt, when the checked present operational mode is the STANDBY mode. In other words, the standby controller 22 may determine a mode to which the CPU 21 should transit, when a mode of the CPU 21 is the STANDBY mode, and when the standby controller 22 receives the interruption request. Herewith, the standby controller 22 makes the microcomputer 200 to perform a transition of operational mode based on the cause of interrupt, only when it is the STANDBY mode. Further, the standby controller 22 makes the microcomputer 200 to perform a transition of operational mode as usual, when it is not the STANDBY mode. That is, it can suppress cost to improve the microcomputer according to the related art.

In this case, for example, between the steps S21 and S22 of FIG. 7, a process which the clock control circuit 221 checks a present operational mode of the microcomputer 200 may be added. For example, the clock control circuit 221 may check a present operational mode by a state of I/O of the clock signal 264, and the clock signals 263a and 263b.

The present invention is not limited to the above-described exemplary embodiments, but various modifications can be made as appropriate to the exemplary embodiments without departing from the spirit and scope of the present invention.

The first, second and third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A microcomputer comprising:
a CPU (Central Processing Unit) that has a plurality of modes including a usual operational mode and a STANDBY mode, a clock supply being stopped in the STANDBY MODE;
a clock generation circuit that generates a clock supplied to the CPU; and
a control circuit that monitors a mode of the CPU, receives an interruption request to the CPU, determines a mode to which the CPU should transit according to a type of the received interruption request, controls the clock generation circuit according to a present mode of the CPU and the determined mode, and outputs the received interruption request to the CPU,
wherein the control circuit controls the clock generation circuit, and does not output to the CPU the received interruption request to the CPU, when the present mode of the CPU comprises a first STANDBY mode and the determined mode comprises a second STANDBY mode.

2. The microcomputer according to claim 1, wherein
the interruption request includes a cause of interrupt representing a type of the interruption request, and
the control circuit further holds correspondence information in which the cause of interrupt and the mode to which the CPU should transit are associated with one another, extracts the cause of interrupt from the interruption request upon receiving the interruption request, and refers to the correspondence information to determine a mode associated with the extracted cause of interrupt as the mode to which the CPU should transit.

3. The microcomputer according to claim 1, wherein
the control circuit holds different modes to which the CPU should transit, depending on whether the interruption request is generated regularly or suddenly.

4. The microcomputer according to claim 1, wherein
the STANDBY mode includes a STOP mode and a HALT mode, the STOP mode comprising a mode to stop generation of a clock of the clock generation circuit and the HALT mode comprising a mode not to stop the generation of the clock, and
the control circuit controls the clock generation circuit to stop the generation of the clock, when the control circuit receives the interruption request to make a mode of the CPU to transit to the STOP mode.

5. The microcomputer according to claim 1, wherein
the control circuit continues to stop the clock supply to the CPU, when the determined mode is the STANDBY mode.

6. The microcomputer according to claim 1, wherein
the control circuit determines the mode to which the CPU should transit, when the mode of the CPU is the STANDBY mode, and the control circuit receives the interruption request.

7. The microcomputer according to claim 1, wherein
the control circuit checks the mode of the CPU, and determines the mode to which the CPU should transit according to the type of the interruption request, when the control circuit receives the interruption request, and
the control circuit controls the clock generation circuit based on the determined mode to which the CPU should transit, only when the checked mode of the CPU and the determined mode to which the CPU should transit are different.

8. A control method of a microcomputer that includes: a CPU (Central Processing Unit) that has a plurality of modes including a usual operational mode and a STANDBY mode, a clock supply being stopped in the STANDBY mode; a clock generation circuit that generates a clock supplied to the CPU; and a control circuit, the control method comprising:
monitoring, by the control circuit, a mode of the CPU;
receiving, by the control circuit, an interruption request to the CPU;
determining, by the control circuit, a mode to which the CPU should transit according to a type of the received interruption request;
controlling, by the control circuit, the clock generation circuit according to a present mode of the CPU and the determined mode; and
outputting, by the control circuit, the received interruption request to the CPU,
wherein the control circuit does not output to the CPU the received interruption request to the CPU, when the present mode of the CPU comprises a first STANDBY mode and the determined mode comprises a second STANDBY mode.

9. The control method of the microcomputer according to claim 8, wherein
the interruption request includes a cause of interrupt representing a type of the interruption request, and
the control circuit further holds correspondence information in which the cause of interrupt, the type of the interruption request, and the mode to which the CPU should transit are associated with one another, extracts the cause of interrupt from the interruption request upon receiving the interruption request, and refers to the correspondence information to determine a mode associated with the extracted cause of interrupt as the mode to which the CPU should transit.

10. The control method of the microcomputer according to claim 8, wherein
the control circuit holds different modes to which the CPU should transit, depending on whether the interruption request is generated regularly or suddenly.

11. The control method of the microcomputer according to claim 8, wherein
the STANDBY mode includes a STOP mode and a HALT mode, the STOP mode comprising a mode to stop generation of a clock of the clock generation circuit and the HALT mode comprising a mode not to stop the generation of the clock, and
controlling, by the control circuit, the clock generation circuit to stop the generation of the clock, when the control circuit receives the interruption request to make the mode of the CPU to transit to the STOP mode.

12. The control method of the microcomputer according to claim 8, wherein
the control circuit continues to stop the clock supply to the CPU, when the determined mode is the STANDBY mode.

13. The control method of the microcomputer according to claim 8, wherein the control circuit determines the mode to which the CPU should transit, when the mode of the CPU is the STANDBY mode, and the control circuit receives the interruption request.

14. The control method of the microcomputer according to claim 8, comprising:
   checking, by the control circuit, the mode of the CPU, and determining, by the control circuit, the mode to which the CPU should transit according to the type of the interruption request, when the control circuit receives the interruption request; and
   controlling, by the control circuit, the clock generation circuit based on the determined mode to which the CPU should transit, only when the checked mode of the CPU and the determined mode to which the CPU should transit are different.

15. The microcomputer according to claim 1, further comprising an interruption control circuit which sends a standby release signal to the CPU.

16. The microcomputer according to claim 15, wherein said interruption control circuit comprises a priority control circuit.

17. The microcomputer according to claim 1, wherein said clock generation circuit comprises a main oscillator and a sub-oscillator.

18. The microcomputer according to claim 1, wherein said plurality of modes further includes one or more of a MAIN-RUN mode, a SUBRUN mode, a MAINHALT mode and a SUBHALT mode.

* * * * *